Feb. 2, 1960
M. STAUNT
2,923,060
DENTAL HANDPIECES
Filed Jan. 8, 1957
2 Sheets-Sheet 1
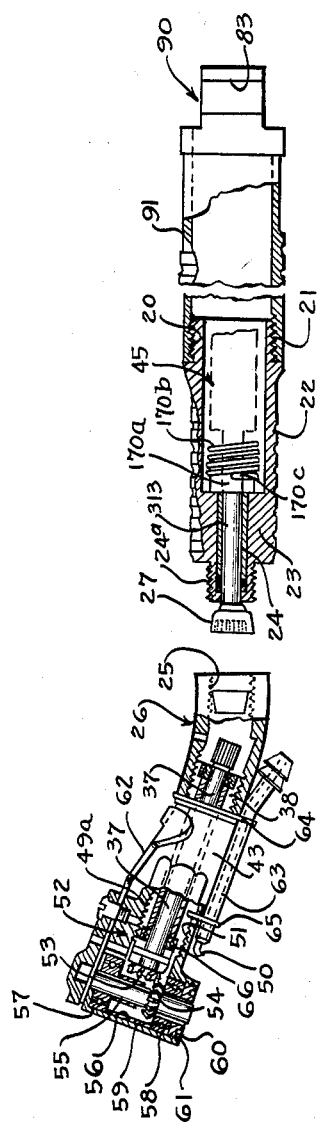
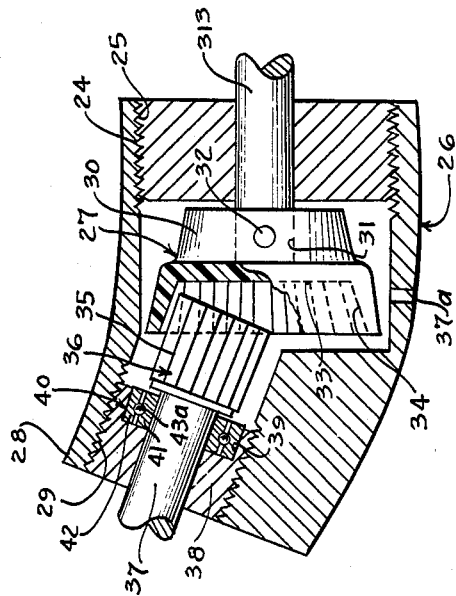
INVENTOR.
Martin Staunt
BY Robert H. Wendt
Attorney Feb. 2, 1960
M. STAUNT
2,923,060
DENTAL HANDPIECES
Filed Jan. 8, 1957
2 Sheets-Sheet 2
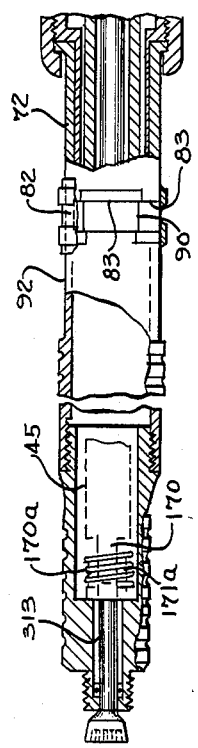
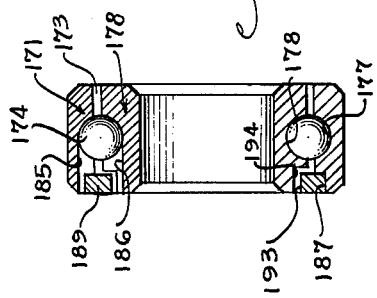
INVENTOR.
Martin Staunt
BY Robert H. Wendt
Attorney United States Patent Office 2,923,060
Patented Feb. 2, 1960

2,923,060

DENTAL HANDPIECES

Martin Staunt, Des Plaines, Ill.

Application January 8, 1957, Serial No. 633,069

4 Claims. (Cl. 32—27)

The present invention relates to dental handpieces, and is particularly concerned with dental handpieces which are adapted to be driven at higher speeds for the purpose of accomplishing the drilling and other operations in a minimum amount of time, and with a minimum amount of discomfort to the patient.

One of the objects of the invention is the provision of an improved contra angle attachment in which higher speeds are achieved at the tool end by the use of an internal gear at the knee joint of the contra angle, cooperating with a pinion.

Another object of the invention is the provision of an improved dental handpiece assembly which is so constructed as to provide for a constant flow of oil and air through the ball bearing contra angle for lubricating and cleaning purposes, thereby greatly extending the life of the ball bearing contra angle and also excluding foreign particles or saliva from the handpiece because of the fluid pressure on the inside of the handpiece.

Another object of the invention is the provision of an improved dental handpiece assembly including an oil reservoir for containing a lubricant of a non-toxic type so that the lubricant may be forced into the handpiece and permitted to maintain a pressure on the inside of the handpiece, which keeps all foreign materials and saliva out of the handpiece.

Another object of the invention is the provision of an improved dental handpiece assembly including an improved contra angle of the ball bearing type and means for automatically lubricating and cleaning the contra angle to keep the ball bearings lubricated at all times and to cool the ball bearings while the handpiece is operating.

Another object of the invention is the provision of an improved high speed dental handpiece and contra angle which is simple, capable of economical manufacture, which may be operated at a very high speed, and which may be used for a long period of time without excessive wear on the ball bearings of the handpiece or the contra angle.

Other objects and advantages of the invention will be apparent from the following description and the accompanying drawings in which similar characters of reference indicate similar parts throughout the several views.

Referring to the two sheets of drawings accompanying this specification,

Fig. 1 is an exploded view showing the contra angle which is provided with an attaching sleeve, by means of which the contra angle and sleeve are made interchangeable with the attachments to be driven by the same handpiece;

Fig. 2 is an axial sectional view on a larger scale showing the knee joint with its internal gear and pinion in greater detail;

Fig. 3 is a view including a sleeve similar to Fig. 1, and showing its attachment to a handpiece to which other similar attachments may also be applied;

Fig. 4 is an axial sectional view taken through the ball bearing assemblies which are preferably employed in the pressure lubricated contra angle head.

Referring to Fig. 3, this is an axial sectional view showing a handpiece with a spindle that is adapted to drive the attachment of Fig. 1, as well as other tools having a shank that can be secured in the chuck provided.

Sleeve 72 is provided at its left end with an annular groove 83 in a reduced portion that is surrounded with a split ring 82, located in the groove and actuated by a knurled band.

The ring 82 is adapted to pass the longitudinally extending lug 90, which is carried by an extension 91, shown in Fig. 1. The lug 90 is partially cylindrical and forms part of the extension sleeve 91, having the same groove 83 for receiving the ring of Fig. 3, which may rotate into the groove 83, and secure the attachment 91 to the sleeve 72.

The spindle 45, shown in dotted lines in Fig. 1, ends in a pair of axially extending lugs 170, to be received between another pair of axially extending lugs 170a and 171a, carried by the shaft 313 of the attachment in Fig. 1.

The handpiece to which the present attachments may be attached is disclosed and covered by my U.S. application Ser. No. 620,434, filed November 5, 1956, for Dental Handpieces; and the disclosure of said application is hereby incorporated by reference thereto.

A coil spring 170b, has one of its ends 170c, secured in a hole in lug 170a, the other end of the spring being free, and the spring surrounding the lugs on shaft 313 and on spindle 45 to provide a universal driving connection.

The extension sleeve 91 is provided with threads 20 on its left and for engaging complementary external threads 21 on the bearing body 22.

Bearing body 22 has a solid end portion 23, provided with a bearing sleeve 24, which may be of stainless steel for rotatably supporting shaft 313.

Body 23 has a reduced threaded end 24a for reception in a threaded bore 25 in the contra angle knee 26. Shaft 313 supports lugs 170a on its right end and an internal gear 27 at its left end.

In order to provide for the internal gear the knee 26 is made larger than usual at its right end, tapered down to the smaller end 28, which has a smaller internally threaded bore 29.

The internal gear 27 has a hub 30 with a bore 31 for receiving shaft 313. Internal gear 27 is secured to the shaft by a through pin 32 and its left end is of cup-shape, having a tapered cavity 33, provided with internal teeth and tooth spaces 34.

The taper of the cup 33 of the internal gear 27 is such that its teeth 34 extend parallel to the teeth 35 on a pinion 36, which may form an integral part of a contra angle shaft 37.

By means of the cup gear 27, which is preferably made of nylon, the stainless steel shaft 37 and its pinion 36 may be driven at about 125,000 r.p.m. when the handpiece shaft is driven at 50,000 r.p.m.

For example, the pinion may have eight teeth while the cup gear has twenty teeth, and by using a nylon cup gear driving a stainless steel shaft and pinion, wear is greatly reduced.

In addition to the reduction of wear by using these particular parts, the knee joint 26 is provided with an opening 37a, whereby the combined air and oil in the form of a mist may be applied under pressure to the inside of the knee joint 26, as described in my prior application, Serial No. 620,434, filed November 5, 1956, on Dental Handpieces.

This air and oil finds its way along the shaft 37, into the contra angle head, the parts of which are also constantly lubricated with the lubricant provided, which is of a non-toxic nature.

Various types of contra angles may be applied to this extension sleeve 22, one of which is shown in Fig. 1. The contra angle has a reduced threaded portion 38, which is threaded into the threaded bore 29 of the knee joint 26.

Reduced extension 38 has a counterbore 39 for receiving a ball bearing assembly 40, comprising inner and outer races 41, 42, and balls 43a, for rotatably supporting shaft 37.

The contra angle includes a tubular member 43 having an externally threaded end portion, and having another counterbore at its left end for receiving a similar ball bearing assembly 66, rotatably supporting the other end of shaft 37.

Reduced threaded portion 49a is threaded into a threaded bore 51 in the contra angle head 52, and shaft 37 supports a bevel gear 53, the teeth of which engage a bevel gear 54 on the bur tube 55.

The contra angle head 52 has a transverse bore 56 within which are arranged ball bearing assemblies 57 and 58, for rotatably supporting the bur tube 55, within which the tool shank is inserted.

A tubular spacer 59 separates the external races but is cut away for the gear 53, and a threaded nut 60 surrounds the bur tube 55 and is threaded into the tool end 61 of the contra angle head to hold the outer races.

The inner races are mounted on the bur tube 55, and the head 52 may be provided with the pivoted lever 62, for engaging the tool shank and holding it in the bur tube 55.

Water and air tubes 63 are carried by rings 64 and 65, clamped between the ends of the tube 43 and the adjacent parts, and the tubes have angularly directed nozzles 50, directing air and water toward the bur end of the tool. The ball bearings used at 57 and 58 and the contra angle head 52 are preferably of the type shown in Fig. 4.

These ball bearings have outer races 171 and inner races 178, provided with balls 174. The races have grooves 177 in the outer race and 178 in the inner race; and these grooves are preferably on a radius which is slightly larger than the balls 174, so that there will be line contact between the ball and its groove at its base.

The races preferably have a minimum clearance between them at 173, and each race has its groove communicating at one side with a slot 185 and 186 to provide a ball filling opening. This ball filling opening is used for the insertion of the balls into the ball bearing assembly, and the balls are then prevented from jumping out into this filling opening by a nylon ring 189, which is pressed into a counterbore 187, in the outer race, and which has a minimum clearance between its inner edge 193 and the adjacent edge 194 of the inner race 178.

The nylon ring 189 in the ball bearings reduces to a minimum the leakage of air and lubricant mist from the contra angle, within which there is always a predetermined pressure, tending to drive any saliva or grindings out of the contra angle, which is also constantly lubricated, as described in my prior application.

It will thus be observed that I have invented an improved contra angle attachment which may be driven at much higher speeds as described, thereby greatly reducing the time of drilling operations and reducing the discomfort of the patient.

My device is in the form of an attachment which may be attached to my prior handpiece, as described in said prior application, thereby enabling the user to drive with this attachment at higher speed and with other attachments at lower speed.

While I have illustrated and described a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A contra angle attachment for dental handpieces, having an extension sleeve for attachment to a handpiece, provided with a driving spindle with a pair of axially extending lugs on its end, said attachment comprising a bearing body threaded into said extension sleeve, and having an axial bearing with an intermediate shaft therein provided with a pair of axially extending lugs to be received between the lugs of said driving spindle, said lugs having outer cylindrical surfaces, and the lugs on said intermediate shaft having a coil spring about them, having the end of the spring turned radially inward and anchored in a hole in one of the lugs on said intermediate shaft, a threaded plug extending from one end of the bearing body, and an internally tapered molded nylon cup gear having a hub secured to said intermediate shaft outside of said threaded plug, a knee joint housing having an obtuse angle and a large threaded bore adapted to pass said cup gear, a contra angle tubular member having ball bearings in its ends, and having a shaft with a stainless steel pinion at one end outside a threaded plug, ending in an annular shoulder, said stainless steel pinion engaging the teeth in said cup gear, a threaded plug, and an annular shoulder on the other end of said tubular member, and a bevel gear on that end of the latter shaft, a contra angle head having a threaded bore for receiving said latter plug, and having a transverse housing portion with a tool receiving shaft mounted at both ends in ball bearings, said tool shaft having a bevel gear driven by the former bevel gear, said assembly driving the tool shaft at speeds of about 125,000 r.p.m.

2. A contra angle attachment according to claim 1, in which said bear bearings are provided with a nylon seal ring and comprising inner and outer races, the ring being carried by the outer race in each case, and having a close clearance with the inner race in front of ball loading openings for effecting an oil seal and preventing balls from jumping out of the ball loading openings.

3. A contra angle attachment according to claim 2, in which the knee joint has a pressure lubricant aperture for receiving air under pressure, entraining edible lubricant passing into the contra angle housing under air pressure, the air and lubricant being held back by the nylon oil seal rings at the ball bearings, but leaking out of the bearing at the tool end, and excluding dirt by flow of air and lubricant under pressure.

4. A contra angle attachment according to claim 1, in which said tubular member has an apertured plate with its aperture on each of the threaded plugs thereof and clamped against the adjacent annular shoulder by the contra angle head and the knee joint and housing, and a water nozzle tube soldered in aligned apertures in said plates, and having its end directed toward a tool end in the tool shaft.

References Cited in the file of this patent

UNITED STATES PATENTS

| | | |
|---|---|---|
| 1,226,454 | Braden | May 15, 1917 |
| 1,380,717 | Herman | June 7, 1921 |
| 2,319,328 | Kaltenbach | May 18, 1943 |
| 2,541,790 | Sugden et al. | Feb. 13, 1951 |